United States Patent
Wensley et al.

(10) Patent No.: US 7,794,511 B2
(45) Date of Patent: Sep. 14, 2010

(54) BATTERY SEPARATOR FOR LITHIUM POLYMER BATTERY

(75) Inventors: C. Glen Wensley, Lakeland, FL (US); Kevin D. Chambers, Fort Mill, SC (US)

(73) Assignee: Celgard Inc., Charlotte, NC (US)

( * ) Notice: Subject to any disclaimer, the term of this patent is extended or adjusted under 35 U.S.C. 154(b) by 505 days.

(21) Appl. No.: 11/671,486

(22) Filed: Feb. 6, 2007

(65) Prior Publication Data

US 2007/0134548 A1 Jun. 14, 2007

(51) Int. Cl.
- H01M 6/00 (2006.01)
- H01M 2/16 (2006.01)
- H01M 10/052 (2006.01)
- B05D 3/02 (2006.01)

(52) U.S. Cl. .............. 29/623.5; 429/144; 429/303; 427/384

(58) Field of Classification Search .............. None
See application file for complete search history.

(56) References Cited

U.S. PATENT DOCUMENTS

| | | | |
|---|---|---|---|
| 4,464,238 A | 8/1984 | Caldwell et al. | |
| 4,650,730 A | 3/1987 | Lundquist et al. | |
| 4,731,304 A | 3/1988 | Lundquist et al. | |
| 5,240,655 A | 8/1993 | Troffkin et al. | |
| 5,281,491 A | 1/1994 | Rein et al. | |
| 5,418,091 A | 5/1995 | Gozdz et al. | |
| 5,456,000 A | 10/1995 | Gozdz et al. | |
| 5,460,904 A | 10/1995 | Gozdz et al. | |
| 5,518,838 A | 5/1996 | Bai et al. | |
| 5,565,281 A | 10/1996 | Yu et al. | |
| 5,604,660 A | 2/1997 | Bai et al. | |
| 5,631,103 A | 5/1997 | Eschbach et al. | |
| 5,639,573 A | 6/1997 | Oliver et al. | |
| 5,658,685 A | 8/1997 | Oliver | |
| 5,665,265 A | 9/1997 | Gies et al. | |
| 5,667,911 A | 9/1997 | Yu et al. | |
| 5,681,357 A | 10/1997 | Eschbach et al. | |
| 5,688,293 A | 11/1997 | Oliver et al. | |
| 5,716,421 A | 2/1998 | Pendalwar et al. | |
| 5,750,284 A | 5/1998 | Pendalwar et al. | |
| 5,834,135 A | 11/1998 | Pendalwar et al. | |
| 5,837,015 A | 11/1998 | Venugopal et al. | |
| 5,849,433 A | 12/1998 | Venugopal et al. | |
| 5,853,916 A | 12/1998 | Venugopal et al. | |
| 5,952,120 A | 9/1999 | Yu et al. | |
| 6,322,923 B1 | 11/2001 | Spotnitz et al. | |
| 6,328,770 B1 | 12/2001 | Gozdz | |
| 6,337,101 B1 | 1/2002 | Gozdz | |
| 6,881,438 B2 | 4/2005 | Daido et al. | |
| 2002/0001753 A1 * | 1/2002 | Pekala et al. | 429/249 |
| 2002/0110732 A1 | 8/2002 | Coustier et al. | |
| 2002/0168564 A1 | 11/2002 | Wensley | |
| 2002/0187401 A1 | 12/2002 | Lee et al. | |
| 2003/0157408 A1 | 8/2003 | Sun | |
| 2007/0100012 A1 * | 5/2007 | Beard | 521/99 |
| 2007/0292750 A1 * | 12/2007 | Beard | 429/101 |

FOREIGN PATENT DOCUMENTS

| | | |
|---|---|---|
| GB | 2298817 | 9/1996 |
| JP | 307146/1995 | 11/1995 |
| JP | 8-250097 | 9/1996 |
| JP | 2642206 | 5/1997 |
| JP | 2001-325951 | 11/2001 |
| JP | 2002-240215 | 8/2002 |
| WO | WO 99/54953 A1 | 10/1999 |
| WO | WO 01/38010 A1 | 5/2001 |
| WO | WO 01/39296 A1 | 5/2001 |
| WO | WO 01/39297 A1 | 5/2001 |

OTHER PUBLICATIONS

A. Gozdz, "Plastic Li-ion (PLION(TM)) Rechargeable Cells with Bonded Microporous Separator," Telcordia Report, (Apr. 6, 2000).

A. Gozdz, et al., "Fabrication and Performance Characteristics of Plastic Li-Ion Batteries With Bonded Untreated Microporous Polyolefin Separators," 198th Meeting of the Electrochemical Society, Oct. 22-27, 2002.

* cited by examiner

*Primary Examiner*—Robert Hodge
(74) *Attorney, Agent, or Firm*—Hammer & Associates, P.C.

(57) ABSTRACT

A battery separator for a lithium battery is disclosed. The separator has a microporous membrane and a coating thereon. The coating is made from a mixture of a gel forming polymer, a first solvent, and a second solvent. The first solvent is more volatile than the second solvent. The second solvent acts as a pore former for the gel-forming polymer.

20 Claims, No Drawings

BATTERY SEPARATOR FOR LITHIUM POLYMER BATTERY

FIELD OF THE INVENTION

The invention is directed to a battery separator for lithium polymer or "gel" batteries.

BACKGROUND OF THE INVENTION

A lithium polymer battery or a lithium gel battery is known. See, for example, U.S. Patent Publication No. 2002/0168564A1 which is incorporated herein by reference. These lithium polymer batteries are different from lithium-ion secondary batteries. Two significant differences are: the use of a gel electrolyte versus the use of a liquid electrolyte, and the flexible packaging for containing the active battery elements versus the rigid can (button or cylindrical or prismatic) for containing the elements.

Originally, the hope of polymer battery developers was to use a gel electrolyte as the separator. That is the gel electrolyte would separate the anode and the cathode. But, that scheme has been left behind for at least two reasons. First, the gel electrolyte did not provide any shutdown capability, a safety feature to reduce the occurrence of catastrophic short-circuiting. Second, the soft gel electrolyte was difficult to handle in the battery manufacturing process. Batteries are typically made in a continuous operation from tapes of the elements and a tape of gel did not have sufficient mechanical strength to withstand the rigors of the manufacturing process.

Now, the gel electrolyte separator is replaced with a gel polymer coated microporous membrane that is subsequently impregnated with a liquid electrolyte. The inclusion of the membrane overcomes the aforementioned problems with the gel electrolyte separator. The membranes can provide the shutdown capability and have the mechanical strength to withstand the rigors of the battery manufacturing process. Exemplary coated separators are described in U.S. Pat. Nos. 5,639,573; 5,681,357; 5,688,293; 5,750,284; 5,837,015; 5,853,916; 6,322,923; 6,328,770; 6,337,101; U.S. Patent Publication No. 2002/0168564; WO99/54953; WO01/39296; and WO01/39297, each is incorporated herein by reference.

In U.S. Pat. No. 6,322,923 and U.S. Patent Publication 2002/0168564, the separator comprises a microporous membrane having a coating. The coating is made from a mixture of a gel forming polymer, a plasticizer, and a solvent. The solvent dissolves the gel forming polymer and the plasticizer so that the mixture may be easily and evenly applied to the membrane. Also, the solvent is relatively volatile, compared to the other components, so that it may be easily removed. The remaining coated separator (i.e., coating comprising gel forming polymer and plasticizer) is not porous and is not ready to be impregnated with electrolyte until it is made porous. The plasticizer is the pore-forming agent. The plasticizer, for example an ester-base phthalate or an organic carbonate, must be extracted to form the pores. This extraction step adds to the cost of the separator.

Accordingly, there is a need for a less expensive coated separator for use in a lithium polymer battery.

SUMMARY OF THE INVENTION

A battery separator for a lithium battery is disclosed. The separator has a microporous membrane and a coating thereon. The coating is made from a mixture of a gel forming polymer, a first solvent, and a second solvent. The first solvent is more volatile than the second solvent. The second solvent acts as a pore former for the gel-forming polymer.

DETAILED DESCRIPTION OF THE INVENTION

In general, a battery comprises an anode, a cathode, a separator, and an electrolyte. The anode and cathode sandwich the separator. The electrolyte resides in the separator and is in electrochemical communication with the anode and cathode. These components are then sealed within a package. The components of this battery are conventional and well known. For example see: Linden, D., Handbook of Batteries, 2nd Edition, McGraw Hill, New York, N.Y. (1995) and Besenhard, J. O., Handbook of Battery Materials, Wiley-VCH, New York, N.Y. (1999).

A lithium polymer (or gel) battery is known. See Linden, Ibid., pgs. 36.37-36.42, Besenhard, Ibid., pgs. 513-517, U.S. Pat. Nos. 5,418,091; 5,456,000; and 5,460,904; each is incorporated herein by reference. The use of microporous membranes as part of the separator for a polymer battery is also known. See U.S. Pat. Nos. 5,518,838; 5,604,660; 5,631,103; 5,639,573; 5,681,357; 5,688,293; 5,750,284; 5,837,015; 5,853,916; 5,658,685; 5,849,433; 5,665,265, 5,716,421; 5,834,135; 6,322,923; 6,328,770; 6,337,101; U.S. Patent Publication No. 2002/0168564A1; WO 99/54953; WO 01/39297; Wo 01/39296; Gozdz, A., "Plastic Li-ion (PLION™) Rechargeable Cells with Bonded Microporous Separator," Telecordia Report, April 2000; and Gozdz, A., et al, "Fabrication and Performance Characteristics of Plastic Li-Ion Batteries With Bonded Untreated Microporous Polyolefin Separators," 198th Meeting of the Electrochemical Society, Oct. 22-27, 2000; each is incorporated herein by reference.

The separator for the gel polymer battery is a microporous membrane having a coating thereon. The coating will be discussed in greater detail after the following discussion of the microporous membrane.

The microporous membrane refers to any suitable microporous membrane. The membrane may be a symmetric membrane or an asymmetric membrane. The membrane may be made from a polyolefin. Exemplary polyolefins include, but are not limited to, polyethylene (PE, including LDPE, LLDPE, HDPE), ultra high molecular weight polyethylene (UHMWPE), polypropylene (PP), polymethylpentene (PMP), copolymers of any of the foregoing, and mixtures thereof. The membrane may be made by either a dry stretch process (also known as the CELGARD® process) or a solvent extraction process (also known as the gel extrusion or phase separation or phase inversion process). The membrane may have the following characteristics: an air permeability (Gurley) of no more than 300 sec/100 cc (preferably $\leq 200$ sec/100 cc, most preferably $\leq 150$ sec/100 cc); a thickness ranging from 5 to 500 microns (μ) (preferably 10 to 100μ, most preferably 10 to 50μ); pore diameters ranging from 0.01 to 10 microns (μ) (preferably 0.02 to 5μ, most preferably 0.02 to 0.5μ); and a porosity ranging from 35 to 85% (preferably 40 to 80%). The membrane may be a single layer membrane, a tri-layer membrane (e.g., PP/PE/PP or PE/PP/PE), or a multi-layer membrane. The membrane is preferably a shutdown separator, for example see U.S. Pat. Nos. 4,650,730; 4,731,304; 5,281,491; 5,240,655; 5,565,281; 5,667,911; 5,952,120; Japanese Patent No. 2642206; and Japanese Patent Application Nos. 98395/1994 (filed May 12, 1994); 7/56320 (filed Mar. 15, 1995); and UK Patent Application No. 9604055.5 (filed Feb. 27, 1996); all of which are incorporated herein by reference. Suitable membranes are commercially available from Celgard Inc., Charlotte, N.C., USA; Asahi Chemical Industry Co. Ltd., Tokyo, Japan; Tonen Corporation, Tokyo, Japan; Ube Industries, Tokyo, Japan; Nitto Denko KK, Osaka, Japan; and Entek International, Lebanon, Oreg., USA.

The coating is added to at least one external surface of the membrane. Preferably, the coating is applied to both external surfaces of the membrane. Preferably, the coating does not substantially (e.g., $\leqq 25\%$ by volume) penetrate into the pores of membrane; most preferably, the coating does not penetrate into the pores. The surface density of the coating, based upon the gel-forming polymer alone, ranges from $0.12$ mg/cm$^2$ to $0.7$ mg/cm$^2$, preferably from $0.15$ mg/cm$^2$ to $0.3$ mg/cm$^2$, and most preferably about $0.25$ mg/cm$^2$. The coating is intended to facilitate bonding of the laminate structure, namely the anode/separator/cathode structure. Additionally, the coating helps retain liquid electrolyte within the laminate structure and thereby reduces the risk of electrolyte leakage.

The coating is applied to the membrane as a mixture of a gel forming polymer, a first solvent, and a second solvent. The gel-forming polymer, described in greater detail below, facilitates bonding of the membrane to the electrodes and retention of the electrolyte within the laminate structure. The solvents, both the first solvent and the second solvent, are preferably organic liquids having a vapor pressure of at least 760 mm Hg at a temperature of 150° C. or less. The first solvent, described in greater detail below, is used to dissolve the gel forming polymer and second solvent. The first solvent allows the gel-forming polymer and second solvent to be intimately mixed and facilitates the even application of mixture over the surface of the membrane. The first solvent should be able to form at least a 20% solution of the other components. The first solvent also is easily driven out of the mixture. Preferably, the first solvent has a boiling point of $\leqq 90°$ C. Easily driven off preferably refers to a solvent that will evaporate with little or no application of drying energy (e.g., heat). The second solvent, described in greater detail below, is also referred to as the pore former for the gel-forming polymer; is a weaker solvent or a non-solvent when compared to the first solvent; and may swell the gel-forming polymer, but does not have to completely dissolve the gel-forming polymer. After the first solvent leaves the mixture, the remaining components form a non-porous coating on the surface of membrane. When the second solvent is driven from the coating, a porous coating of gel forming polymer resides on the surface of the membrane. The second solvent is less volatile than the first solvent (i.e., it is not as easily driven off as the first solvent), so that it remains (or substantially remains) while the first solvent is removed. Preferably, the second solvent has a boiling point of about 20° C. or more than the first solvent, preferably, about 30° C. or more above the first solvent. Preferably, the second solvent has a boiling point no greater than about 150° C. The second solvent may be driven off by the application of drying energy (e.g., heat).

The gel-forming polymer may be selected from, but is not limited to, polyvinylidene fluoride (PVDF); polyurethane, polyethylene oxide (PEO), polypropylene oxide (PPO); polyacrylonitrile (PAN), polyacrylamide, polymethylacrylate, polymethylmethacrylate, polyvinylacetate, polyvinylpyrrolidnone, polytetraethylene glycol diacrylate; copolymers of the foregoing, and combinations thereof. One criteria for comonomer selection is the comonomer's ability to modify the surface energy of the homopolymer. Surface energy impacts, at least: the solubility of the copolymer, thereby affecting coating the copolymer onto the membrane; the adhesion of the copolymer to the membrane, thereby affecting battery manufacture and subsequent performance; and the wettability of the coating, thereby affecting absorption of the liquid electrolyte into the separator. Suitable comonomers include, but are not limited to, hexafluoropropylene (HFP), octofluoro-1-butane, octofluoroisobutane, and tetrafluoroethylene. The comonomer content preferably ranges from 3 to 20% by weight, preferably 7 to 15%. Preferably, the gel-forming polymer is a copolymer of polyvinylidenefluoride. Preferably, the PVDF copolymer is a copolymer of polyvinylidenefluoride and hexafluoropropylene (PVDF:HFP), and most preferred is PVDF:HFP with a weight ratio of 91:9. The PVDF polymer and copolymers are commercially available from Atochem, Philadelphia, Pa., USA, Solvay SA, Brussels, Belgium, and Kureha Chemicals Industries, Ltd., Ibaraki, Japan. A preferred PVDF:HFP copolymer is KYNAR 2800 from Atochem.

The first solvent may be selected from, but is not limited to, tetrahydrofuran, methylethylketone, acetone, low molecular weight glymes, and combinations thereof. The first solvent is the major component of the mixture that forms the coating. The mixture is a dilute solution, where the first solvent forms from 80-99% by weight of the mixture, preferably 85-95%, and most preferably 86-88%. The preferred first solvent is acetone.

The second solvent is the pore former for the gel-forming polymer. The first solvent is more volatile than the second solvent (e.g., the second solvent has a lower vapor pressure at the same temperature than the first solvent). The second solvent may be selected from, but is not limited to, propanol, isopropanol, butanol, and mixture thereof. In addition to the second solvent, some water may be added. The weight ratio of gel forming polymer to second solvent may be 1:0.5 to 1:4, preferably in the range of 1:2 to 1:3. When water is added to the second solvent, the water to second solvent ratio is in the range of 0.25:1 to 2:1, preferably 0.5:1. The second solvent is not a plasticizer. Plasticizers are, for example, phthalate based esters, cyclic carbonates, polymeric carbonates, and mixtures thereof. Phthalate-based esters are selected from, but are not limited to, dibutylphthalate. Cyclic carbonates are selected from, but not limited to, ethylene carbonate (EC), propylene carbonate (PC), butylene carbonate (BC), and mixtures thereof. Polymeric carbonates are selected from, but are not limited to, polyvinylene carbonate and linear propylene carbonates.

In the manufacture of the foregoing coated separator, the mixture is prepared. The mixture may be applied to the membrane in any conventional manner, e.g., coating, immersion, spraying. Preferably, the mixture is applied by a double side, dip coating process. The first solvent is allowed to evaporate, preferably without the use of heat. Thereafter, the second solvent is evaporated, preferably in an oven with the application of heat. Uniformity of resistance of the coated separator is of paramount importance to the battery manufacturer. Uniformity of resistance, as measured by McMullin Number, is controlled by controlling the relative humidity (% RH) during the coating process. It has been determined that when the % RH is below 45%, preferably between 15-45%, and most preferably between 38-44% that the McMullin Number (see U.S. Pat. No. 4,464,238 for discussion of McMullin Number, incorporated herein by reference) may be controlled within the range of 5-12, preferably 5-6 with a coating density of about 0.25 mg/cm$^2$.

In the manufacture of a lithium polymer battery with the foregoing separator, prior to the lamination of the foregoing separator between the anode and the cathode, the separator should be treated with a solvent and/or plasticizer to plasticize (or soften) the coating, so that it can bond to the electrodes when they are laminated together. Lamination occurs by the application of heat and pressure usually applied via nip rollers. The treatment is preferably a solution comprising a plasticizer and a solvent. This solution preferably comprises between 10 to 30% by weight of plasticizer in the solution, most preferably 15 to 20%. The plasticizers include alkylene carbonates, dialkyl phthalates, dialkyl succinates, dialkyl adipates, dialkyl sebacates, trialkyl phosphates, polyalkylene glycol ethers, and mixtures thereof. The solvents include lower alcohols, ketones, esters, aliphatic hydrocarbons, halogenated solvents, chlorinates hydrocarbons, chlorinated fluorocarbons, and mixtures thereof. The solution may be applied in any conventional manner, such as coating, dipping, or spraying.

The foregoing shall be further illustrated with reference to the following examples.

EXAMPLES

In the following examples, the mixture comprised 280-285 pounds (127-130 kg) acetone; 8.5 pounds (3.8 kg) PVDF:HFP copolymer (Kynar FLEX® 2800 from Atofina Chemicals, Inc., Philadelphia, Pa.); 22.7 pounds (10.3 kg) isopropanol; and 11.3 pounds (5.1 kg) water. The mixture was applied by a double side, dip coating process. Add-on was controlled in the range of about 0.25 mg/cm². Acetone was allowed to evaporate. The isopropanol/water was removed by evaporation in an oven. It has been determined that the uniformity (as measured by the McMullin Number) of the separator is improved when the percent relative humidity during the coating and drying steps is controlled to between 15-44%.

| Roll # | Actual % Rel. Humidity | McMullin # | Add-On Finish mg/cm² |
|---|---|---|---|
| 1 | 17 | 14.3 | — |
| 2 | 17 | 18.9 | — |
| 3 | 8 | 6.8 | 0.24 |
| 4 | 9 | 23.9 | 0.20 |
| 5 | 10 | 7.5 | 0.23 |
| 6 | 9 | 17.1 | 0.47 |
| 7 | 9 | 9.5 | 0.25 |
| 8 | 9 | 10.1 | 0.28 |
| 9 | 10 | 14.5 | 0.24 |
| 10 | 41 | 8.1 | 0.23 |
| 11 | 42 | 6.5 | 0.23 |
| 12 | 42 | 6.6 | 0.24 |
| 13 | 9 | 15.0 | 0.23 |
| 14 | 9 | na | — |
| 15 | 10 | 10.5 | 0.22 |
| 16 | 9 | 11.0 | 0.22 |
| 17 | 9 | 12.6 | 0.23 |
| 18 | 10 | 14.5 | 0.21 |
| 19 | 13 | 12.6 | 0.21 |
| 20 | 44 | 6.8 | 0.27 |
| 21 | 49 | 8.5 | 0.28 |
| 22 | 54 | 8.1 | 0.27 |
| 23 | 49 | 11.2 | 0.27 |
| 24 | 54 | 8.4 | 0.29 |
| 25 | 52 | na | 0.24 |
| 26 | 45 | na | 0.25 |
| 27 | 48 | 9.1 | 0.22 |
| 28 | 45 | 5.5 | 0.23 |
| 29 | 44 | 10.7 | 0.23 |
| 30 | 54 | 10.3 | 0.23 |
| 31 | 48 | 12.2 | 0.24 |
| 32 | 45 | 11.7 | 0.22 |
| 33 | na | 11.4 | 0.23 |
| 34 | 41 | 6.0 | na |
| 35 | 41 | 5.8 | na |
| 36 | 42 | 5.9 | na |
| 37 | 42 | 5.9 | na | na = not available

The present invention may be embodied in other forms without departing from the spirit and the essential attributes thereof, and, accordingly, reference should be made to the appended claims, rather than to the foregoing specification, as indicated the scope of the invention.

That which is claimed:

1. A method of making a battery separator for a lithium polymer battery comprises the steps of:
   providing a microporous membrane,
   providing a mixture of a gel forming polymer, a first solvent and a second solvent, the first solvent being at least 80% by weight of the mixture and more volatile than the second solvent, and said second solvent adapted to form pores in the gel-forming polymer, wherein said first solvent is selected from the group consisting of: tetrahydrofuran, methylethylketone, acetone, low molecular weight glymes, and mixtures thereof, wherein said second solvent is not a plasticizer, wherein said second solvent is selected from the group consisting of butanol, propanol, isopropanol, and mixtures thereof, and wherein water is added into said second solvent in a range of 0.25:1 to 2:1;
   coating the mixture onto at least one side of the microporous membrane,
   driving off the first solvent, thereby forming a microporous membrane coated with a non-porous coating of the gel forming polymer and the pore forming second solvent, and
   driving off the second solvent, thereby forming a microporous membrane coated with a porous coating of the gel forming polymer.

2. The method of claim 1 wherein coating comprises dip coating.

3. The method of claim 1 wherein driving off the second solvent comprises heating.

4. The method of claim 1 wherein a weight ratio of gel forming polymer to said second solvent is 1:0.5 to 1:4.

5. The method of claim 1 wherein said gel forming polymer is selected from the group consisting of: polymers, polymers and comonomers and combinations thereof, where said polymer is selected from the group consisting of polyvinylidene fluoride, polyurethane, polyethylene oxide, polypropylene oxide, polyacrylonitrile, polyacrylamide, polymethylacrylate, polymethylmethacrylate, polyvinylacetate, polyvinylpyrrolidnone, polytetraethylene glycol diacrylate, copolymers of the foregoing, and mixtures thereof;
   where said comonomers are selected from the group consisting of:
   hexafluoropropylene, octofluoro-l-butane, octofluoroisobutane, tetrafluoroethylene and combinations thereof.

6. The method of claim 5 wherein said gel forming polymer being a polyvinylidene fluoride:hexafluoropropylene copolymer.

7. The method of claim 1 wherein said first solvent is acetone.

8. The method of claim 1 wherein said second solvent is isopropanol.

9. The method of claim 5 wherein said comonomer content ranges from 3 to 20% by weight.

10. The method of claim 5 wherein said comonomer content ranges from 7 to 15% by weight.

11. The method of claim 5 wherein said gel forming polymer has a weight ratio of 91:9 where 91 is polyvinylidene fluoride and 9 is hexafluoropropylene.

12. The method of claim 1 wherein the coating step is performed to both external surfaces of said microporous membrane.

13. The method of claim 1 wherein said porous coating has a surface density ranging from 0.12 mg/cm² to 0.7 mg/cm².

14. The method of claim 13 wherein said porous coating has a surface density ranging from 0.15 mg/cm² to 0.3 mg/cm².

15. The method of claim 1 wherein driving off the first solvent comprises evaporating.

16. The method of claim 1 wherein the gel forming polymer is selected from the group consisting of polyvinylidene fluoride, polyurethane, polyethylene oxide, polypropylene oxide, polymethylacrylate, polymethylmethacrylate, polyvinylacetate, polyvinylpyrrolidnone, polytetraethylene glycol diacrylate, copolymers of the foregoing, and mixtures thereof.

17. The method of claim 1 wherein the microporous membrane coated with a porous coating of the gel-forming polymer has a uniformity of resistance McMullin Number in the range of 5 to 12.

18. The method of claim 17 wherein the microporous membrane coated with a porous coating of the gel-forming polymer has a uniformity of resistance McMullin Number in the range of 5 to 6.

19. The method of claim 1 wherein the relative humidity (%RH) during the coating step is below 45%.

20. The method of claim 19 wherein the relative humidity (%RH) during the coating step is in the range of 38 to 44%.

* * * * *

UNITED STATES PATENT AND TRADEMARK OFFICE
CERTIFICATE OF CORRECTION

| | |
|---|---|
| PATENT NO. | : 7,794,511 B2 |
| APPLICATION NO. | : 11/671486 |
| DATED | : February 6, 2007 |
| INVENTOR(S) | : C. Glen Wensley et al. |

It is certified that error appears in the above-identified patent and that said Letters Patent is hereby corrected as shown below:

On the title page, item 63 1st column, immediately below "Filed: Feb. 6, 2007," add the following:
Related U.S. Application Data
This application is a division of U.S. Serial no. 10/446,380 filed on May 28, 2003, now abandoned.

Signed and Sealed this
Sixteenth Day of February, 2016

Michelle K. Lee
*Director of the United States Patent and Trademark Office*